United States Patent [19]

Parman

[11] Patent Number: 4,565,214

[45] Date of Patent: Jan. 21, 1986

[54] FLAPPER CHECK VALVE ASSEMBLY

[75] Inventor: Oscar D. Parman, Rochester, Mich.

[73] Assignee: Dover Corporation, Troy, Mich.

[21] Appl. No.: 616,959

[22] Filed: Jun. 4, 1984

[51] Int. Cl.[4] ............................................. F16K 15/14
[52] U.S. Cl. ................................. 137/512.15; 137/854
[58] Field of Search ................ 137/512.15, 512.4, 854, 137/454.4; 417/566

[56] References Cited

U.S. PATENT DOCUMENTS

| | | | |
|---|---|---|---|
| 724,641 | 4/1903 | Wiki | 137/854 X |
| 1,634,949 | 7/1927 | LeValley | 137/854 X |
| 2,609,660 | 9/1952 | Tenney | 137/854 X |
| 2,725,075 | 11/1955 | Irgens | 137/854 X |
| 3,037,522 | 6/1962 | Millan | 137/854 X |
| 4,319,452 | 3/1982 | Morita | 137/512.15 X |

Primary Examiner—Robert G. Nilson

[57] ABSTRACT

Integrated flapper check valve assembly consisting of cylindrical flapper check valve housing with valve seats and air passage ports, cylindrical flapper check backer with air passage ports, and intermediate flapper check valve with flat multi-leaf design.

12 Claims, 10 Drawing Figures

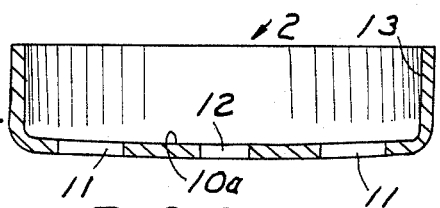
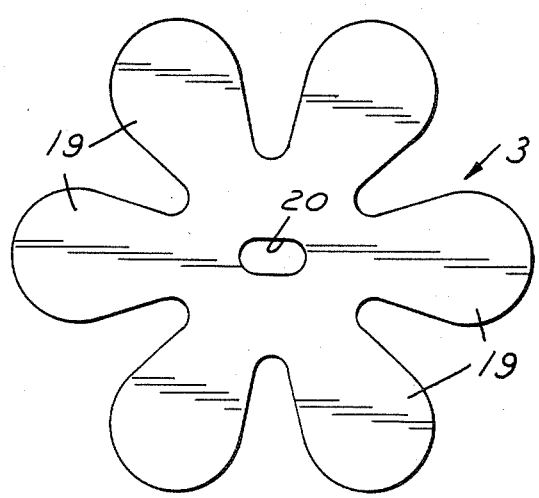
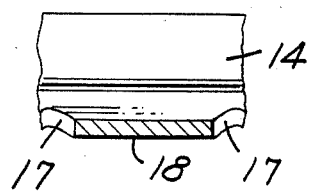
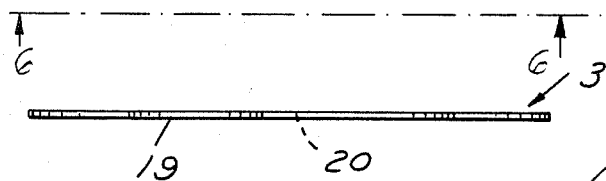
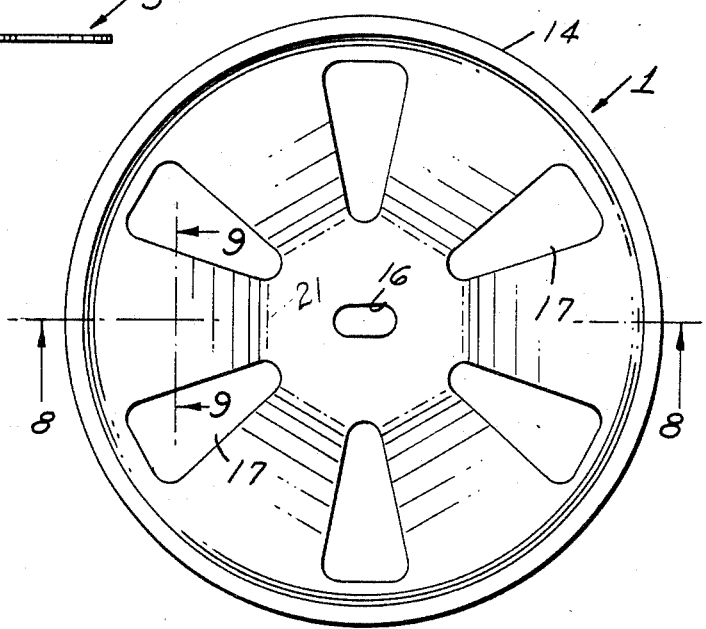
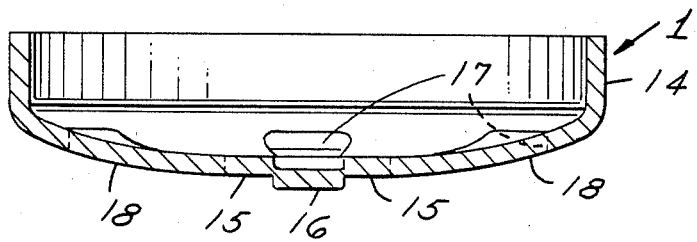

FLAPPER CHECK VALVE ASSEMBLY

BACKGROUND OF THE INVENTION

Flapper check valves are known in the art which are flat in configuration and have multiple leafs integrally stamped from flat spring steel stock which are adapted to cover and seal multiple ports in a flat plate or housing surface, such leafs being adapted to flex to an open position when the pressure differential is higher on the sealed port side of the flapper valve. The assembly of such valves normally involves discreet housing and backup provisions, if any, which do not readily accommodate simple insertion in a plate, an airline tube or cylindrical passage to operate as a one-way check valve.

BRIEF SUMMARY OF THE PRESENT INVENTION

Applicants have developed the present flapper check valve assembly to meet such requirement by providing a housing with a cylindrical outer wall and internal recess terminating in a flat, or arcuately coined internal end surface having multiple circular ports uniformly spaced in a circular pattern; a flat flapper valve having multiple leafs uniformly spaced in a matching circular pattern to cover such ports in one-way sealing relation; the outer perimeter of the multiple leafs being dimensioned to provide free clearance relative to the inside cylindrical wall of the housing; and a center aperture of non-circular configuration in the flapper valve adapted to fit in alignment with a corresponding aperture in the center of the housing end wall when the multiple leafs of the flapper check valve are in sealing orientation with said ports; an annular flapper check backer with a cylindrical wall closely fitting within the cylindrical wall of the housing and having a shallow convex curved configuration extending radially from a central housing matching flat portion or arcuate with multiple air ports equal in number and uniformly spaced between the housing ports; the central portion of the flapper check backer engaging the center of the multiple leaf flapper check valve with a semi-pierced projection matching the center apertures in the respective flapper valve and housing which serves to engage and retain the three housing, flapper valve and backer components of the flapper check valve assembly in proper orientation.

BRIEF DESCRIPTION OF THE DRAWINGS

FIG. 4A is a sectional view similar to FIG. 4 illustrating a slightly concave inner end surface.

FIG. 5 is a plan view of the flapper check valve shown in the assembly views of FIGS. 1 and 2;

FIG. 6 is a side elevation taken along the line 6—6 of FIG. 5;

FIG. 7 is a plan view of the flapper check valve backer shown in the assembly views of FIGS. 1 and 2;

FIG. 8 is a sectional view taken along the line 8—8 of FIG. 7.

FIG. 9 is a sectional view taken along the line 9—9 of FIG. 7.

DETAILED DESCRIPTION OF A PREFERRED EMBODIMENT OF THE INVENTION

Figure 1:
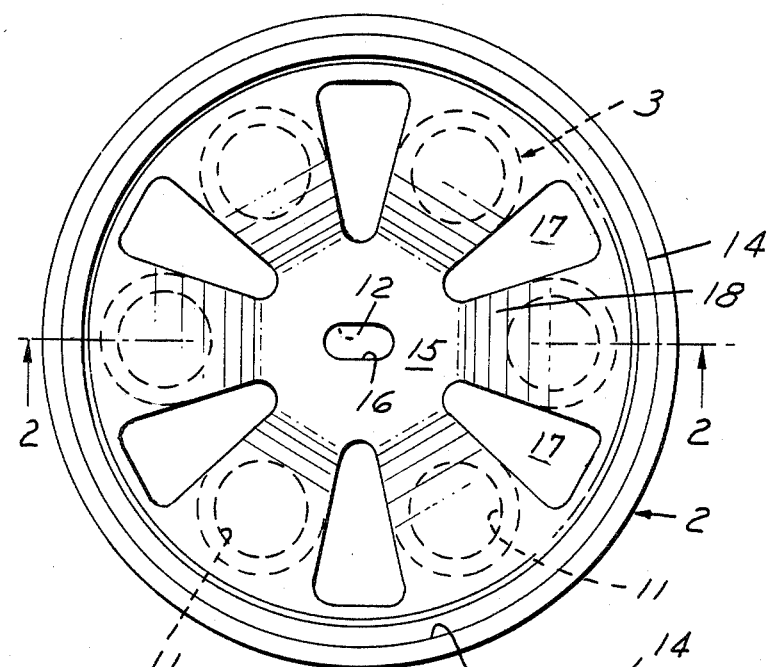
FIG. 1 is an enlarged plan view of a preferred embodiment of the flapper check valve assembly.
Figure 2:
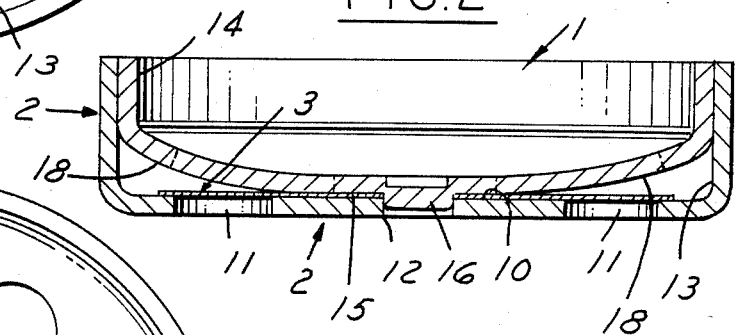
FIG. 2 is a sectional view taken along the line 2—2 of FIG. 1.

With reference to FIG. 2 the flapper check valve assembly of the present invention comprises backer 1, housing 2 and valve 3 with backer 1 press fit within housing 2 to engage the center of flapper valve 3 and retain it in assembled orientation relative to the ports in housing 2. Optionally, the O.D. of backer 3 may be dimensioned for slip fit within housing 2 and spot-welded thereto.

Figure 3:
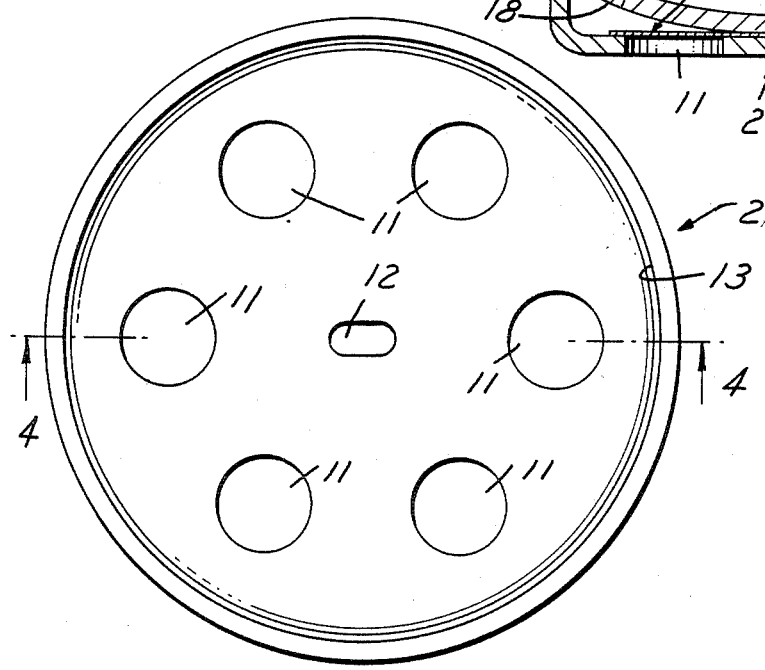
FIG. 3 is a plan view of the flapper check valve housing shown in the assembly views of FIGS. 1 and 2.
Figure 4:
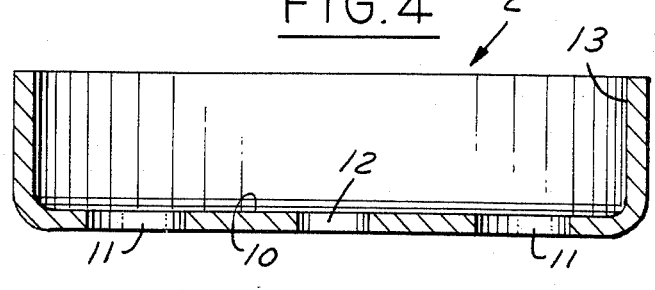
FIG. 4 is a sectional view taken along the line 4—4 of FIG. 3.

With reference to FIGS. 3 and 4 housing 2 is formed with a flat coined inner end surface 10 having six equally spaced port apertures 11 formed therein, as well as central oval aperture 12, and is formed with straight cylindrical inner side wall 13 adapted for close fit relation with outer cylindrical side wall 14 of flapper check valve backer 11 illustrated per se in FIGS. 7 and 8. Backer 1 is provided with flat hexagonal central portion 15 in which semi-pierce projection 16 is formed to match and engage aperture 12 in housing 2 when the six ports 17 formed in curved bottom backer surface 18 extend uniformly between ports 11 in housing 2.

With reference to FIGS. 5 and 6 flapper check valve 3 is formed with the six equally spaced leaves 19 adapted to align in sealing relation with ports 11 when its central aperture 20 and matching housing aperture 12 are engaged by semi-pierce projection 16. Convex lower curved surface 18 of backer 1 is adapted to provide backing engagement limiting flexure for multiple leaves 19 within acceptable fatigue stress parameters of flapper valve stock determined by the thickness and elasticity modulus of the spring steel.

As shown in FIGS. 7-9 a single plane of curvature begins radially outwardly from the central flat beginning along a straight line 21 extending between each of the adjacent ports 17. Each segment of such curved surface is tangent with the central flat so that progressive wrapping of each flapper leaf on the backup surface is free of any stress riser and the curvature of the circular arc 18 alone establishes the maximum bending stress to which each leaf is subjected.

While flat flapper valve 3 extending across ports 11 in flat surface 10 of housing 2 provides substantially complete sealing against flow in the check valve direction, particularly where substantial pressure differential creates sealing pressure on the flapper leaves, a more positive assurance against leakage even under relatively low pressure differentials, and some minimum pressure differential for initial opening of the valve, may be provided by establishing a predetermined preload of sealing pressure of leaves 19 against ports 11. This may be accomplished, even with a perfectly flat flapper valve 3, by coining a slight concave curvature 10a in place of flat surface 10 in housing 2 so that a slight flexure of flapper leaves 19 occurs in assembling backer 1 against flapper valve 3 with clearance at the center taken up. The coined curvature may be such as to provide progressive wrapping with uniform sealing pressure distribution over the port with simple flexing curvature of flapper leaves 19. Whether a flat or slight preload surface is employed in housing 2, pressure differentials normally encountered within design parameters will cause check valve leaves 19 to flex to an intermediate position sufficient to open ports 11 and accommodate lateral air passage to and through ports 17, the passage flow are increasing with pressure differential.

Check valve flapper 3 is preferably constructed of stainless flapper valve steel processed with "ISO FINISH" tumbling to remove burrs and heal rough edges thereby providing required flexural fatigue endurance characteristics. The combination of coined flat surface 10, whether flat or slightly concave, and ISO FINISHED flat surface of check valve flapper 3 provides substantially leakproof one-way check valve operation, and it will be seen that the simple assembly may be readily installed by press fit in any plate, circular tube or cylindrical aperture free of any service maintenance requirement.

I claim:

1. Cylindrical housing with flat multi-port integral end closure, flat multi-leaf flapper valve, and cylindrical flapper valve backer closely fitting within said cylindrical housing with convex backup segments and intermediate ports for retaining said multi-leaf flapper valve in one-way sealing orientation with the multiple ports of said housing, said backer being provided with a flat central portion adapted to engage said flat flapper valve with interengaging means to retain relative proper sealing orientation with said multi-ported housing.

2. The assembly of claim 1 wherein said cylindrical backer fits within said cylindrical housing with a press fit.

3. The assembly of claim 1 wherein said cylindrical flapper valve backer is spot welded to said cylindrical housing in assembled relation.

4. Cylindrical housing with flat multi-port end closure, flat multi-leaf flapper valve, and cylindrical flapper valve backer with convex backup segments and intermediate ports for retaining said multi-leaf flapper valve in one-way sealing orientation with the multiple ports of said housing, said backer being provided with a flat central portion adapted to engage said flat flapper valve with interengaging means to retain relative proper sealing orientation with said multi-ported housing, said means for retaining orientation comprising a non-circular aperture in the center of the end closure of said housing, a matching aperture in said flapper check valve and a semi-pierce matching projection in said backer.

5. The assembly of claim 4 including curved convex end segments of said backer extending radially from said flat central portion providing means for simple curvature flexural engagement by the multiple leaves of said flapper valve.

6. The assembly of claim 5 wherein each segment has a straight line tangent juncture with said flat central portion.

7. Cylindrical housing with slightly concave multi-port integral end closure, flat multi-leaf flapper valve, and cylindrical flapper valve backer closely fitting within said cylindrical housing with convex backup segments and intermediate ports for retaining said multi-leaf flapper valve in one-way sealing orientation with the multiple ports of said housing, said concave end closure providing a predetermined preload means for effective sealing under low pressure differential and/or minimum pressure differential for opening flow, said backer being provided with a flat central portion adapted to engage said flat flapper valve with interengaging means to retain relative proper sealing orientation with said multi-ported housing.

8. The assembly of claim 7 wherein said cylindrical backer fits within said cylindrical housing with a press fit.

9. The assembly of claim 7 wherein said cylindrical flapper valve backer is spot welded to said cylindrical housing in assembled relation.

10. Cylindrical housing with slightly concave multi-port end closure, flat multi-leaf flapper valve, and cylindrical flapper valve backer with convex backup segments and intermediate ports for retaining said multi-leaf flapper valve in one-way sealing orientation with the multiple ports of said housing, said concave end closure providing a predetermined preload means for effective sealing under low pressure differential and/or minimum pressure differential for opening flow, said backer being provided with a flat central portion adapted to engage said flat flapper valve with interengaging means to retain relative proper sealing orientation with said multi-ported housing, said means for retaining orientation comprising a non-circular aperture in the center of the end closure of said housing, a matching aperture in said flapper check valve and a semi-pierce matching projection in said backer.

11. The assembly of claim 10 including curved convex end segments of said backer extending radially from said flat central portion providing means for simple curvature flexural engagement by the multiple leaves of said flapper valve.

12. The assembly of claim 11 wherein each segment has a straight line tangent juncture with said flat central portion.

* * * * *